United States Patent [19]

Black, Jr.

[11] Patent Number: 5,661,993

[45] Date of Patent: Sep. 2, 1997

[54] PUNCH TOOL AND METHOD FOR MANUFACTURING TRUSS PLATES

[75] Inventor: William H. Black, Jr., Edenton, N.C.

[73] Assignee: Tee-Lok Corporation, Edenton, N.C.

[21] Appl. No.: 446,223

[22] Filed: May 22, 1995

[51] Int. Cl.[6] .................................................. B21D 31/02
[52] U.S. Cl. ................................................ 72/325; 72/379.2
[58] Field of Search ........................ 72/325, 326, 379.2; 29/897.3; 411/468, 466; 52/712, 715, DIG. 6

[56] References Cited

U.S. PATENT DOCUMENTS

| | | | |
|---|---|---|---|
| 3,473,362 | 10/1969 | Black | 72/326 |
| 3,479,920 | 11/1969 | Sanford | 85/13 |
| 3,498,170 | 3/1970 | Sanford | 85/13 |
| 3,603,197 | 9/1971 | Wood | 85/13 |
| 3,633,454 | 1/1972 | Schmitt et al. | 85/13 |
| 3,685,336 | 8/1972 | Black, Jr. | 72/325 |
| 4,031,803 | 6/1977 | Jureit et al. | 85/13 |
| 4,165,672 | 8/1979 | Jureit et al. | 85/13 |
| 4,235,148 | 11/1980 | Menge | 85/13 |
| 4,318,652 | 3/1982 | Gore | 411/468 |
| 4,343,580 | 8/1982 | Moyer et al. | 411/468 |
| 4,418,509 | 12/1983 | Moyer et al. | 52/693 |
| 4,423,615 | 1/1984 | Moyer et al. | 72/326 |
| 4,639,176 | 1/1987 | Smith et al. | 411/468 |
| 4,641,480 | 2/1987 | Mort | 52/693 |
| 4,694,675 | 9/1987 | Mort | 72/325 |
| 4,734,003 | 3/1988 | Smith et al. | 411/468 |
| B1 3,951,033 | 7/1987 | Moehlenpah | 411/468 |

*Primary Examiner*—Daniel C. Crane
*Attorney, Agent, or Firm*—Bell, Seltzer, Park & Gibson, P.A.

[57] ABSTRACT

A truss plate includes a generally planar backing member that includes a plurality of elongate apertures defined by a pair of side edges and a pair of end edges and a plurality of teeth, each of which extends in a first direction from one side of the backing member. At least some of the teeth comprise a shank and a tip portion. The shank extends from a position adjacent an end edge of one of the apertures and comprises a major shank portion, a minor shank portion, and an arcuate base portion. The major shank portion is generally arcuate in cross-section. The major and minor shank portions are separated by a crease extending in the first direction from the backing member, with one end of the crease being substantially centered between the side edges of the aperture. The shank is twisted about an axis parallel to the first direction so that the major shank portion is substantially larger than the minor shank portion. The tip portion has a generally planar inner surface and a pair of sloping edges terminating in a sharp point. The tip portion is fixed to and merges with the major and minor shank portions opposite the base. The sloping edges are of different lengths. Truss plates having teeth with this configuration have proven to be stronger than prior art truss plates of equivalent thickness and material type. A punch tool for forming such truss plates is also disclosed.

9 Claims, 3 Drawing Sheets

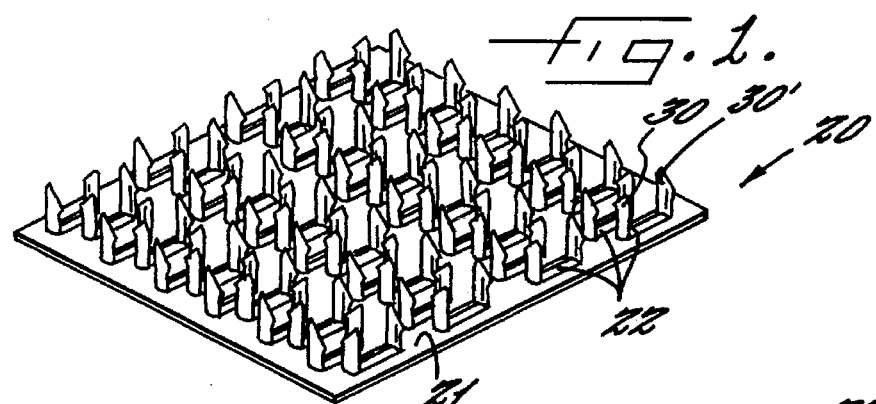
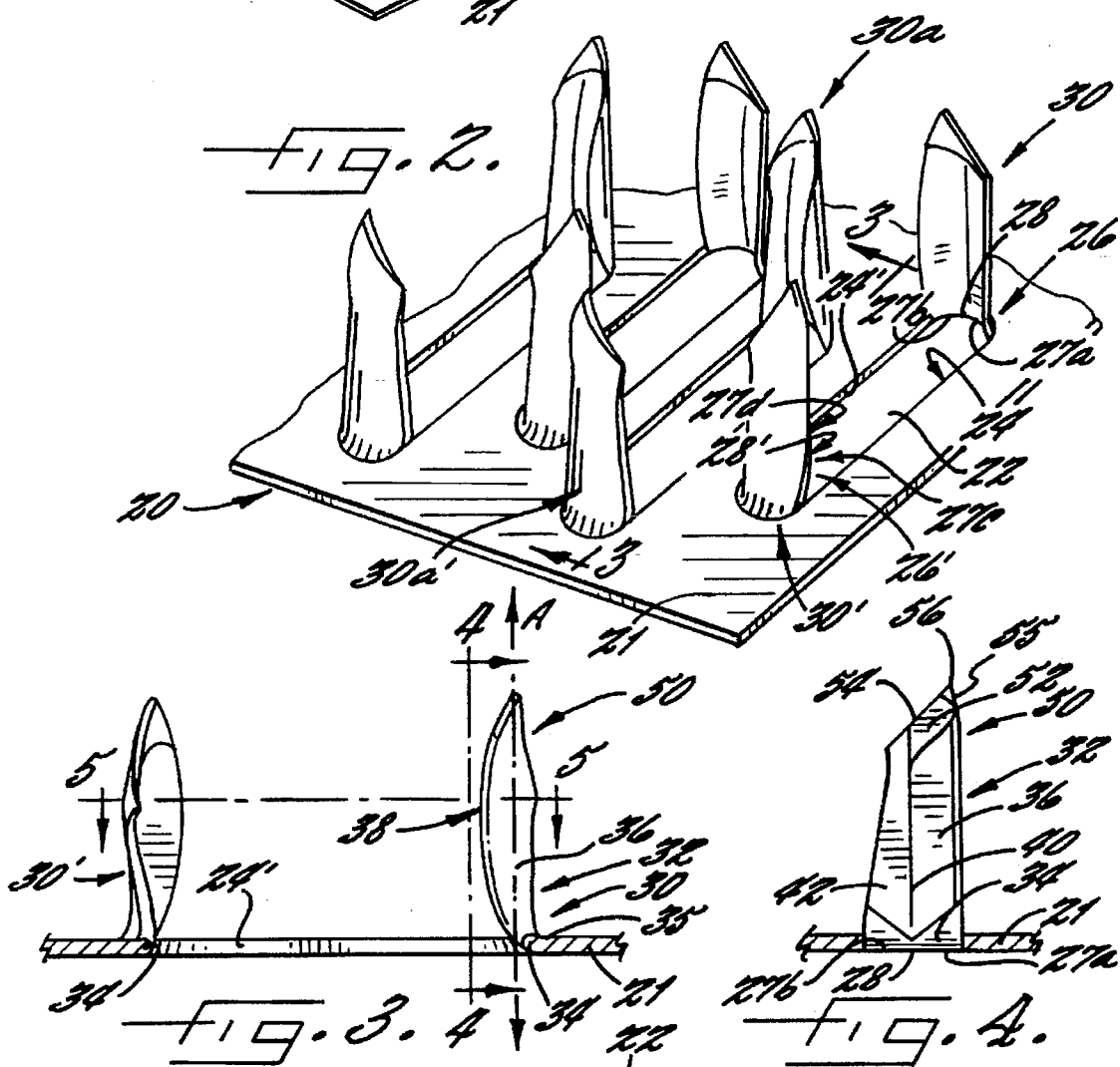
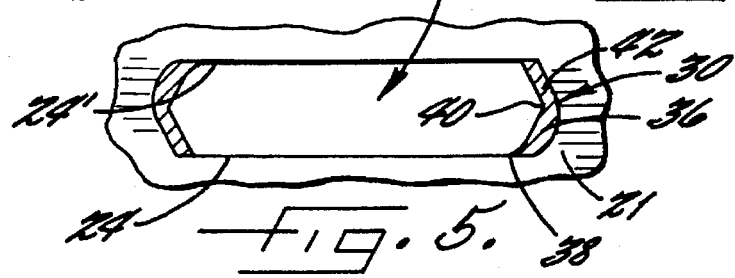

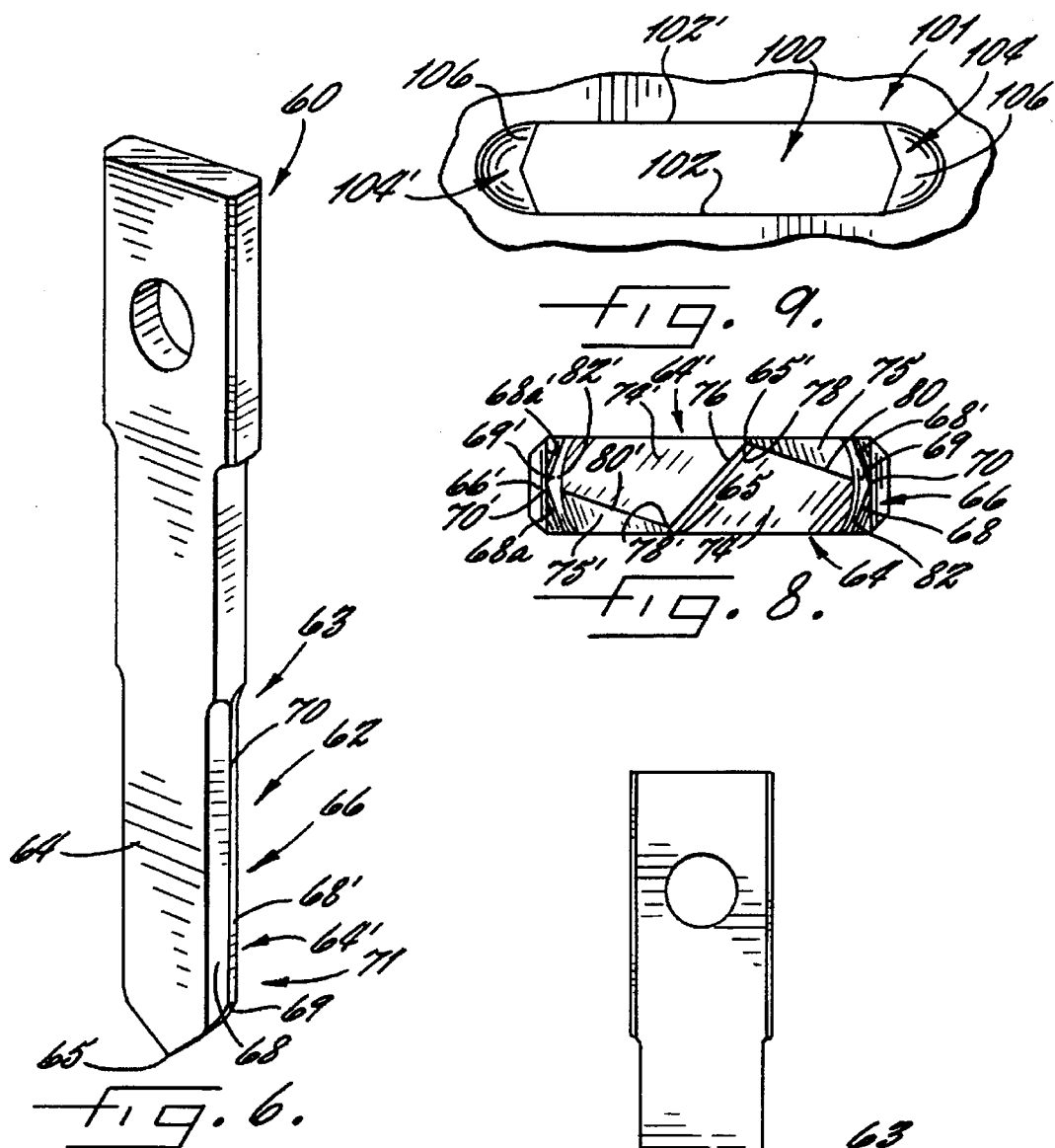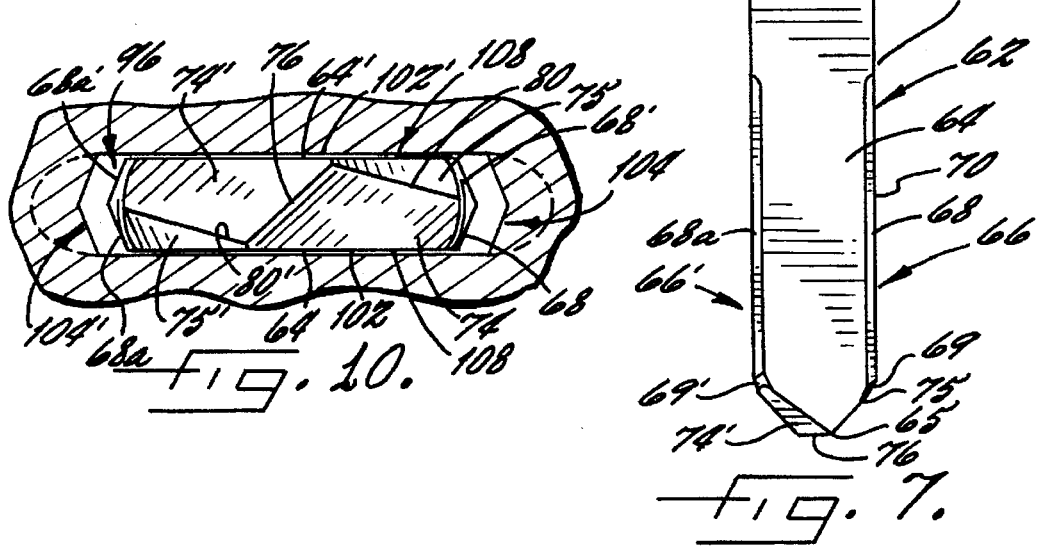

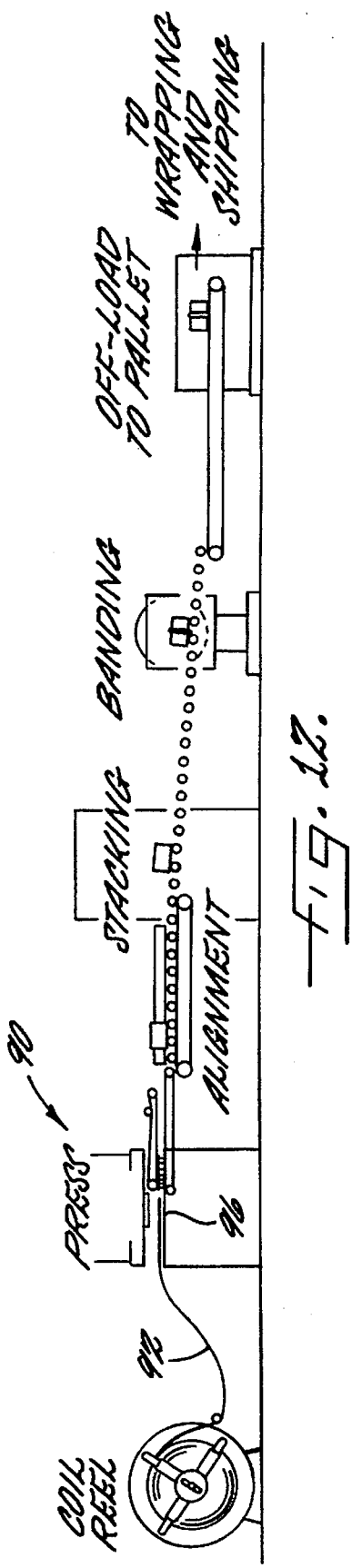
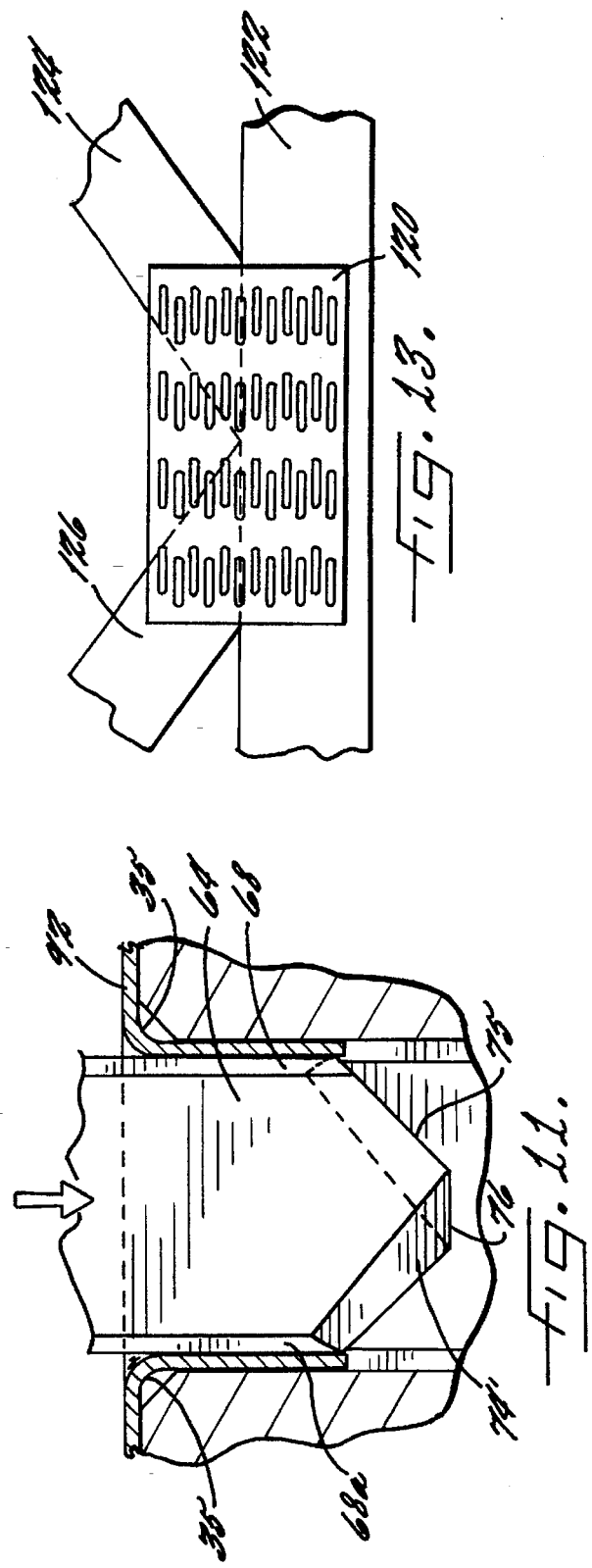

PUNCH TOOL AND METHOD FOR MANUFACTURING TRUSS PLATES

FIELD OF THE INVENTION

The present invention is directed generally at truss plates employed in the construction of tresses, and is directed more specifically to the configuration of the impaling members present in such truss plates.

BACKGROUND OF THE INVENTION

Truss plates are generally employed to join planks of lumber that form floor and roof trusses used in residential housing. Truss plates typically comprise a backing plate and an array of sharp spike-like impaling members, or teeth, that extend outwardly from the backing plate. Adjacent planks of a truss with coplanar surfaces can be permanently joined by pounding or pressing the backing member of a truss plate so that its impaling members penetrate the planks.

Truss plates are typically manufactured by striking out the teeth from a steel sheet with a punch. The punch, which is oriented is essentially perpendicularly to the sheet material, is pressed into the sheet; the punch penetrates and punctures the sheet, thereby forming an aperture therein. The portions of the sheet contacted by the punch remain attached to the remainder of the sheet and are forced by the punch (and usually by a mating female die) into an upright configuration extending away from the sheet. It is these portions extending away from the sheet that form the teeth of the truss plate.

Most commonly, the teeth are formed with a punch having an elongated, generally rectangular cross-section. The aperture formed by such a punch is an elongate rectangle, and the teeth originate from the ends (rather than from the sides) of the aperture.

Truss plate manufacturers are constantly searching for ways to improve the performance of truss plates. In considering truss plate performance, the strength of joints formed by the truss plates, which can be subjected to axial, transverse, shear, and torsional forces, the ease of penetration of the truss plates into planks, and the buckling strength of the tooth (which is important to successful penetration) should be considered. Because the thickness of the truss plate (and its teeth) is often specified by building code or by a particular blueprint, truss plate designers will typically alter the configuration of the tooth when attempting to improve joint strength under different loads and ease of tooth penetration. The final configuration of the teeth depends in large part on the configuration of the punch and the die. An example of a specialized tooth configuration is illustrated in U.S. Pat. No. 3,951,033 to Moehlenpah, which discloses a tress plate having a tooth with an angled, rather than a generally flat, cross-section. One portion of the tooth extends perpendicularly to the longitudinal axis of the punching aperture from which it was formed, and the other portion of the tooth extends at an angle of 135 degrees thereto toward the opposite end of the punching aperture. This tooth is characterized as resisting "rotation relative to the wood members when subjected to axial, nonaxial, and torsional loading." However, in practice truss plates utilizing this tooth proved to be quite difficult to press into wooden planks. Also, because the portion of the sheet steel that forms the angled face of the tooth is forced to move a considerable distance during punching, tooth strength suffers.

A truss plate having similarly angled teeth is disclosed in U.S. Pat. No. 4,418,509 to Moyer et al. The Moyer et al. truss plate differs from that of Moehlenpah in that the angled portions of the teeth disclosed therein narrow to terminate in a sharp side edge. Pairs of teeth are formed with a punch tool that, in cross-section, is a rectangle with two opposite corners being beveled at an angle of 135 degrees relative to the side and end faces of the punch. The female die has a rectangular cross-section with the same opposite corners being beveled at a somewhat sharper angle relative to the side faces of the die. The gap between these angled corners of the punch and die form the narrowed edge of the tooth. However, punching such teeth from sheet steel requires that the portion of the steel that forms the angled section be severely contorted and compressed. As a result, truss plates having these teeth have proven to have low tooth strength.

Others have altered the tooth configuration of truss plates by modifying the cross-sectional profile of the tooth. For example, U.S. Pat. No. 4,639,176 to Smith et at. discloses a truss plate employing pairs of teeth, each of which has a tip portion that extends toward the other tooth of the pair. The theory behind this tooth configuration is that the angled tips improve resistance to the tress plate peeling or being lifted from the wooden planks. Unfortunately, truss plates employing these teeth have been unsuitable due to the tendency of the teeth to buckle when inserted into wooden planks, particularly if the tooth tip contacts an especially rigid portion of the wood grain (such as that of the "winter grain" of the wood). Similar problems are experienced by the truss plates employing teeth with angled tips disclosed in U.S. Pat. No. 3,633,454 to Schmidt et al., and by truss plates employing teeth having a nonlinear backbone. See U.S. Pat. No. 4,318,652 to Gore.

In view of the foregoing, it is an object of the present invention to provide a truss plate having improved resistance to axial, transverse, shear, and torsional loads.

It is also an object of the present invention to provide a truss plate with teeth that easily penetrate wooden planks irrespective of whether the teeth contact soft or rigid portions of the wooden planks.

It is another object of the present invention to provide a punch tool for forming such a truss plate.

It is a further object of the present invention to provide a method for manufacturing such a truss plate.

SUMMARY OF THE INVENTION

These and other objects are satisfied by the present invention, which includes as a first aspect a truss plate having improved strength. The truss plate of the present invention comprises: a generally planar backing member that includes a plurality of elongate apertures defined by a pair of side edges and a pair of end edges; and a plurality of teeth, each of which extends in a first direction from one side of the backing member. At least some of the teeth comprise a shank and a tip portion. The shank extends from a position adjacent an end edge of one of the apertures and comprises a major shank portion, a minor shank portion, and an arcuate base portion. The major shank portion is generally arcuate in cross-section. The major and minor shank portions are separated by a crease extending in the first direction from the backing member, with one end of the crease being substantially centered between the side edges of the aperture. The shank is twisted about an axis parallel to the first direction so that the major shank portion is substantially larger than the minor shank portion. The tip portion has a generally planar inner surface and a pair of sloping edges terminating in a sharp point. The tip portion is fixed to and merges with the major and minor shank portions opposite the base. The sloping edges are of different lengths. Truss plates having teeth with this configuration have proven to be stronger than prior art tress plates of equivalent thickness and material type.

The truss plates of the present invention can be formed in an air cutting process with a punch tool. The punch tool of the present invention comprises an elongate shank and a tip portion. The elongate shank is defined by a pair of opposing, planar, generally parallel side faces and a pair of opposed edge portions. The shank has a base portion at one longitudinal end thereof and a contact end portion at the opposite end thereof. Each edge portion comprises a pair of elongate end faces and further comprises an arcuate shoulder at the contact end portion. Each end face abuts an edge of the corresponding end face of the pair and also abuts an edge of a side face such that the abutting end faces form an angle of between about 125 and 145 degrees. Each of the side faces terminate at a side face termination point at the contact end thereof. The tip portion is located on the contact end of the shank and comprises a pair of opposed major faces and a pair of opposed minor faces. Each of opposed major faces is bordered by a portion of one of the side faces, a portion of one of the shoulders, a contact edge that extends between two contact edge termination points, each of which is immediately adjacent a respective side face termination point, and one of a pair of dividing edges, each of which extends between a respective contact edge termination point and a central portion of a respective shoulder. Each of the major faces extends away from the bordering end face to the most distant contact edge termination point. Each of the minor faces is bordered by one of the dividing edges, a portion of one of the side faces, and a portion of one of the shoulders. Each of the minor faces extends away from the bordering end face to the nearest contact edge termination point. This punch tool is employed to strike and penetrate a sheet material and thereby form a pair of opposed teeth therein.

BRIEF DESCRIPTION OF THE DRAWINGS

FIG. 1 is a perspective view of a tress plate of the present invention.

FIG. 2 as an enlarged perspective view of the truss plate of FIG. 1 showing four pairs of opposed teeth.

FIG. 3 is a side view of a pair of teeth taken along line 3—3 of FIG. 2.

FIG. 4 is an end view of a tooth taken along line 4—4 of FIG. 3.

FIG. 5 is a top section view taken along line 5—5 of FIG. 3.

FIG. 6 is a perspective view of a punch tool employed to form the truss plate of FIG. 1.

FIG. 7 is a side view of the punch tool of FIG. 6.

FIG. 8 is a bottom view of the punch tool of FIG. 6.

FIG. 9 is a top view of a female die that mates with the punch tool of FIG. 6.

FIG. 10 is a bottom section view showing a punch tool of FIG. 6 inserted within the mating female die of FIG. 9.

FIG. 11 is a side section view of the punch and die combination of FIG. 10.

FIG. 12 is a schematic side view of a stamping operation used to form the truss plate of FIG. 1.

FIG. 13 is a plan view showing a truss plate of the present invention inserted into abutting wooden planks to join them together.

DETAILED DESCRIPTION OF THE INVENTION

The present invention will be described more particularly hereinafter with reference to the accompanying drawings.

The invention is not intended to be limited to the illustrated and disclosed embodiments; rather, these embodiments are intended to fully and completely disclose the invention to those skilled in this art.

Referring now to the drawings, a truss plate, designated broadly at 20, is shown in FIG. 1. The truss plate 20 comprises a generally planar backing member 21, a plurality of elongate apertures 22 formed therein, and pairs of teeth 30, 30' associated with each of the apertures 22 extending away from the backing member 21. The truss plate 20 is typically formed from 20 gauge, 18 gauge, or 16 gauge steel, although other steel thicknesses are also suitable for use in truss plates. The truss plates are typically formed of steel having a yield strength of about 33 ksi, but can also be formed from so-called "high-yield" steel, which has a yield strength of about 60 ksi. The thickness and material type of a particular truss plate determine its performance characteristics, which in turn determine which joints of a truss the truss plate can be used to interconnect.

The illustrated rectangular shape of the backing member 21 is preferred; common rectangular backing member sizes include backing members that measure 3 inches in width by 4 inches in length and those that measure 5 inches in width by 6, 7, or 8 inches in length, but backing members 21 may be as large as 20 inches in length and width or even larger, or 1 or 2 inches in length and width or even smaller. It should be understood that the backing member 21 can take other forms, such as those in which the corners of a rectangular backing member are rounded or beveled, which are also suitable for use with the present invention.

It should also be noted that adjacent pairs of teeth 30, 30' are alternately staggered from one another such that the first, third, and ensuing odd-numbered pairs of teeth in a row are aligned, and the second, fourth, and ensuing even-numbered pairs are aligned along a different section of the backing member 21. Although this tooth arrangement is preferred, those skilled in this art will appreciate that other tooth arrangements, such as those in which all pairs of teeth in a row are aligned, are also encompassed by the present invention.

Referring now to FIGS. 2 and 3, each aperture 22 is defined by a pair of opposed, substantially parallel side edges 24, 24' that extend along the length of the apeme 22, and also by a pair of V-shaped end edge portions 26, 26' that extend along the ends of the aperture 22. The end edge portion 26 comprises two angled edges 27a, 27b, and a substantially centered vertex 28; similarly, the end edge portion 26' comprises two angled edges 27c, 27d and a substantially centered vertex 28'. The angled edges 27a and 27b and the angled edges 27c and 27d each should form an angle of between about 130 and 140 degrees; preferably, this angle is about 135 degrees.

FIG. 2 shows four adjacent pairs of teeth, each of which is designated either 30, 30' or 30a, 30a'. The pairs comprising teeth 30, 30' are the mirror images of the pairs comprising teeth 30a, 30a' about a plane normal to the backing member 21 and extending between and equidistant from the apertures 22 shown in FIG. 2. The teeth 30, 30' of the truss plate 20 are configured so that the moth 30 positioned at the aperture end edge portion 26 is virtually identical to the tooth 30' positioned at the opposite aperture end edge portion 26', but is rotated 180 degrees about an axis normal to the backing member 21. Similarly, the teeth 30a, 30b are configured so that tooth 30a (which is essentially a "lefthanded" version of the tooth 30) positioned at the aperture end edge portion 26 is virtually identical to the tooth 30a' positioned at the opposite aperture end edge portion 26', but is rotated 180 degrees about an axis normal to the backing member 21. In the interest of clarity and brevity, only the tooth 30 will be described in detail herein; those skilled in this art will understand that the discussion is equally applicable to the teeth 30', 30a, 30a'.

The tooth 30 comprises a shank 32 and a tip portion 50 (FIGS. 2 through 5). The shank 32 includes a base 34 that merges with the backing member 21 adjacent the aperture end edge portion 26. A fillet 35 provides a smooth transition between the base 34 and the backing member 21. Preferably, the fillet has a radius of between about 0.030 inches and 0.080 inches; more preferably, the fillet has a radius of about 0.040 inches. Above the base 34, the shank 32 is divided into a major portion 36 and a minor portion 42, each of which rises from a respective aperture end edge 27. A crease 40 that extends substantially perpendicular to the backing member 21 and that rises from the vertex 28 of the aperture end edge portion 28 separates the shank major portion 36 from the shank minor portion 42. Opposite the crease 40, the major shank portion 36 has a sharp edge 38.

The shank 32 is twisted about an axis A that is normal to the backing member 21 so that the major shank portion 36 is substantially larger than the minor shank portion 42; preferably, the twist angle of the shank 32 relative to the backing member 21 (measured as the angle formed by the tip portion inner surface 52 and an imaginary line extending perpendicular to the longitudinal axis of the aperture 22 and parallel to the backing member 21) is between about 35 and 45 degrees. The major shank portion 36 is generally arcuate in cross-section (FIG. 5); preferably, the shank minor portion 42 is also slightly arcuate. In addition, the contours of the inner and outer surfaces of the shank 32 are not continuously smooth; instead, the contour of each has a discontinuity at crease 40. Illustratively and preferably, the discontinuity at the crease 40 is such that the portion of the major shank portion 36 adjacent the crease 40 forms an angle of about 135 degrees with the portion of the minor shank portion 42 adjacent the crease 40. This discontinuity causes the tooth to have a "footprint" with a smaller transverse cross-section (as measured between the edges of the tooth) and a greater angular perimeter (as measured around the outer surface of the tooth) than would a tooth without such a crease.

As can be best seen in FIGS. 2 and 5, the teeth 30, 30' are positioned at opposite ends of the elongate aperture 22, with the tooth 30 having its major shank portion 36 positioned on one side of its corresponding crease 40, and with the tooth 30' on the opposite end of the elongate aperture 22 having its major shank portion 36 positioned on the opposite side of its corresponding crease 40. As such, the teeth 30 and 30' are positioned on opposite "corners" of the aperture 22.

Referring now to FIG. 4, the tip portion 50 merges with and extends from the end of the shank 32 opposite the base 34. The tip portion 50 has a generally planar inner surface 52 which faces the opposing tooth 30'. The inner surface 52 is generally normal to the backing member 21. The tip portion 50 is bordered at its upper end by a pair of sloping edges 54, 55 of differing lengths; these sloping edges 54, 55 terminate at a sharp point 56. Notably, the sharp point 56 is substantially linearly aligned with a section of the shank major portion 36. As a result, the "backbone" of the tooth is substantially straight and thus resists buckling when pressed into wooden planks.

Preferably, the truss plate 20 is formed through an air cutting process. Such a process is well known to those skilled in the art and is described in some detail in U.S. Pat. No. 3,685,336 to Black. However, those skilled in this art will appreciate that the truss plates of the present invention may be formed by other manufacturing techniques and still be suitable for use in the present invention.

In an air cutting or other stamping process, a punch tool, such as that designated at 60 in FIGS. 6 through 8, can be used to form pairs of opposed teeth 30, 30'. The punch tool 60 comprises an elongate shank 62 that defined by a pair of opposing, planar, generally parallel side faces 64, 64', and a pair of edge portions 66, 66'. The side faces 64, 64' each extend from a base end 63 toward a contact end 71; each of the side faces 64, 64' narrows at the contact end 71 to terminate in a side face termination point 65, 65'.

Each of the edge portions 66, 66' comprises a pair of end faces (68, 68' and 68a, 68a', respectively) which share an abutting edge 70, 70'. Also, each of the end faces 68, 68', 68a, 68a' abuts a longitudinal edge of a respective one of the side faces 64, 64'. The end faces 68, 68' form an angle of between about 125 and 145 degrees; more preferably, the angle between the end faces 68, 68' is between about 130 and 140 degrees, and most preferably the angle is about 135 degrees. The end faces 68a, 68a' have a similar angular relationship. At the contact end 71 the end faces 68, 68', 68a, 68a' merge with, respectively, arcuate shoulders 69, 69'.

The tip portion 72 of the punch tool 60 (FIG. 8) comprises a pair of opposed major faces 74, 74' and a pair of opposed minor faces 75, 75'. Each of the major faces 74, 74' is bordered by a contact edge 76 that extends between two contact edge termination points 78, 78'. Each of the contact edge termination points 78, 78' is positioned adjacent a respective side face termination point 65, 65'. Each of the major faces 74, 74' is also bordered by one of a pair of dividing edges 80, 80', each of which extends between one of the contact edge termination points 78, 78' and a respective shoulder central portion 82, 82'. The contact edge termination points 78, 78' are each positioned immediately adjacent a respective side face termination point 65, 65'. Preferably, the contact edge termination point 78 is about 0.005 inches from its adjacent side face termination point 65; however, it is intended that the description of the side face termination point 65 and the contact edge termination point 78 as being "immediately adjacent" also include punch tools in which these termination points are coincident. Each of the major faces 74, 74' is also bordered by a portion of one of the side faces 64, 64' and by a portion of the shoulders 69, 69'. Each of the major faces 74, 74' extends away from its bordering shoulder portion 69, 69' to the contact edge termination point 78, 78' farthest from that bordering shoulder portion 69, 69'.

Each of the minor faces 75, 75' is bordered by one of the dividing edges 80, 80', a portion of one of the shoulder 69, 69', and a portion of a side face 64, 64'. Each minor face 75, 75' extends away from its bordering shoulder 69, 69' to the contact edge termination point 78, 78' nearest that bordering shoulder 69, 69'.

As seen in FIG. 7, the contact edge 76 is positioned so that each of the dividing edges 80, 80' extends from its respective shoulder central portion 82, 82' at an angle of about 135 degrees in a plane substantially parallel to one of the side faces 64, 64'. Also, the portions of the side face 64, 64' bordering the minor faces 75, 75' extend from the shoulders 69, 69' at an angle of about 135 degrees in a plane parallel with one of the side faces 64, 64'. Further, as seen in FIG. 8, the contact edge 76 forms an angle of between about 130 and 140 degrees with the side faces 64, 64' in a plane parallel with the contact edge 76 and normal to either of the side faces 64, 64'.

In operation, punch tools such as that illustrated in FIGS. 6–8 are used in a stamping press, such as that designated at 90 in FIG. 12, to form tress plates. As can be seen in FIG. 12, a continuous steel sheet 92 is fed into the stamping press 90. A plurality of substantially identical punch tools 60 are lowered by the stamping press 90 into the steel sheet 92. Each of the punch tools 60 is received within a female die 96, which, along with the punch tool 60, directs the steel punched from the steel sheet 92 to form a pair of teeth 30, 30'. After the sheet 92 is stamped, it is sliced transversely into individual truss plates 20.

A suitable female die aperture, designated at 100, is illustrated alone in FIG. 9 and with a representative punch tool 60 in FIGS. 10 and 11. The die aperture 100 is defined by a pair of side faces 102, 102' and a pair of V-shaped end portions 104, 104'. As with the punch 60, preferably the end portions 104, 104' form an angle of between about 125 and 145 degrees, more preferably form an angle of between 130 and 140 degrees, and most preferably form an angle of about 135 degrees. Each of the end portions 104, 104' merges with the upper surface 101 of the female die via a fillet 106, 106', which preferably has a radius of between about 0.030 inches and 0.080 inches. Notably, illustratively and preferably the die aperture 100 and the punch tool 60 are configured so that a gap 108 (preferably about 0.005 inches in width) is formed between the side faces of the punch tool 60 and the side faces 102, 102' of the die aperture 100. As can be seen in FIG. 10, this gap 108 receives a portion of the forming tooth and forms therefrom a sharp side edge.

As the steel sheet 92 is punched, the contact edge 76 of the punch tool 60 first contacts the steel sheet 92 and forms an angled slit therein. This slit ultimately forms the longer of the sloping edges 54, 55 of the tooth 30. As the punch tool 60 continues to penetrate the steel sheet 92, the minor faces 75, 75' contact the steel sheet 92 and form slits at the contact end of the side faces 64, 64'. Simultaneously, the portions of the side edges 64, 64' that border the major faces 74, 74' also form slits in the steel sheet; however, the slits adjacent the major faces 74, 74' form more slowly than those adjacent the minor faces 75, 75'. As a result of the contact of the steel sheet 92 with the minor faces 75, 75' and of the delayed slit formation adjacent the major faces 74, 74', the portions of the steel sheet 92 forming the teeth 30, 30' are forced toward the major faces 74, 74'. This movement causes the teeth 30, 30' to be twisted about an axis substantially perpendicular to the steel sheet 92. The abutting edges 70, 70' of the punch tool end faces 68, 68', 68a, 68a' resist the twisting movement to some degree and also form the crease 40. A portion of the major shank 36 is forced into the gap 108 between the side face 64 of the punch tool and the side face 102 of the female die 96. As the punch tool 60 reaches the end of its punching stroke, the tooth 30 is forced against the fillet 106, thereby forming the tooth fillet 35.

FIG. 13 illustrates a truss plate, designated therein at 120, after it has been inserted into three abutting wooden planks 122, 124, 126. The truss plate 120 is inserted so that at least some of the teeth formed therein penetrate the plank 122, some other of the teeth penetrate the plank 124, and some other of the teeth penetrate the plank 126. The backing member of the truss plate 120 overlies the abutting edge portions of the planks 122, 124, 126. Those skilled in this art will appreciate that truss plates of the present invention can be used to interconnect as few as two abutting planks or can be used to interconnect numerous planks in the appropriate configuration. It will also be recognized by those skilled in this art that the truss plates can be inserted with hand tools, such as a hammer, or with a press, such as that illustrated in U.S. Pat. No. 5,392,908 to Black, the disclosure of which is hereby incorporated herein by reference in its entirety.

The truss plates of the present invention have proved to be stronger in axial loading tests than prior art truss plates. Although the inventors do not wish to be bound by a single theory of operation, it is theorized that, unlike prior art truss plates having teeth with sections angled at approximately 135 degrees, the truss plates of the present invention have teeth that, during manufacturing, are forced to move transversely from their original positions in the sheet steel considerably less than the teeth of the prior art truss plates. This is because the punch tool has an end edge portion that is symmetrical about the longitudinal axis of the aperture left by the forming teeth. As a result, the 135 degree angle within the tooth section can be retained with less tooth movement. Further, the arcuate shape of the teeth provides greater rigidity and strength than teeth having non-arcuate cross-sections. Moreover, the inclusion of a crease in each tooth also provides a transition in cross-sectional contour that adds strength and rigidity to the tooth. The overall effect of a tooth having major and minor shank portions separated by a crease and twisted about an axis generally perpendicular to the backing member is a tooth with a reduced effective transverse cross-section and greater perimeter angle than prior art teeth; thus, configuration results in increased strength. Notably, because the tip portion of the tooth is generally perpendicular to the backing member of the truss plate, the tooth smoothly enters wooden planks without buckling, and the sharp side edge of the shank major portion helps to slice through even rigid winter wood grain.

The foregoing embodiments are illustrative of the present invention, and are not to be construed as limiting thereof. The invention is defined by the following claims, with equivalents of the claims to be included therein.

That which is claimed is:

1. A punch tool for forming teeth in a truss plate having a generally planar backing member and a plurality of teeth extending from one side thereof, said punch tool comprising:

an elongate shank defined by a pair of opposing, planar, generally parallel side faces and a pair of opposed edge portions, said shank having a base portion at one longitudinal end thereof and a contact end portion at the opposite end thereof, each edge portion comprising a pair of elongate end faces symmetrical about a plane parallel to and equidistant between said side faces, and further comprising an arcuate shoulder at said contact end portion, each end face abutting an edge of the corresponding end face of the pair and also abutting an of a side face, said abutting end faces forming an angle of between about 125 and 145 degrees, each of said side faces terminating at a side face termination point at the contact end thereof; and a tip portion located on the contact end of said shank, said tip portion comprising a pair of opposed major faces, each of which is bordered by a portion of one of said side faces, a portion of one of said shoulders, a contact edge that extends between two contact edge termination points, each of which is immediately adjacent a respective side face termination point, and one of a pair of dividing edges, each of which extends from a respective contact edge termination point to a central portion of a respective shoulder, each or said major faces extending away from said bordering end face to the most distant contact edge termination point, said tip portion further comprising a pair of minor faces, each of which is bordered by one of said dividing edges, a portion of one of said side faces, and a portion of one of said shoulders, each of said minor facts extending away from said bordering end face to the nearest contact edge termination point.

2. The punch tool defined in claim 1, wherein said angle formed between said end faces is between about 130 and 140 degrees.

3. The punch tool defined in claim 1, wherein said angle formed between said end faces is about 135 degrees.

4. The punch tool defined in claim 1, wherein said dividing edge extends from said shoulder to said contact edge termination point at an angle of about 135 degrees in a plane substantially parallel with one of said side faces.

5. The punch tool defined in claim 4, wherein said portion of said side face bordering said minor face extends from said shoulder at an angle of about 135 degrees in a plane parallel with one of said side faces.

6. The punch tool defined in claim 1, wherein said contact edge forms an angle of between about 130 and 140 degrees with one of said side faces in a plane parallel with said contact edge and normal to said one of said side faces.

7. The punch tool defined in claim 6, wherein said dividing edge extends from said shoulder to said contact edge termination point at an angle of about 135 degrees in a plane substantially parallel with one of said side faces.

8. The punch tool defined in claim 1, wherein each of said contact edge termination points is about 0.005 inches from said adjacent side face termination point.

9. A method of manufacturing truss plates, comprising the steps of:

providing a punch tool, said punch tool comprising:

an elongate shank defined by a pair of opposing, planar, generally parallel side faces and a pair of generally parallel opposed edge portions defining a longitudinal axis therebetween, said shank having a base portion at one longitudinal end thereof and a contact end portion at the opposite end thereof, each edge portion comprising a pair of elongate end faces symmetrical about said longitudinal axis, and further comprising an arcuate shoulder at said contact end portion, each end face abutting an edge of the corresponding end face of the pair and also abutting an edge of a side face, said abutting end faces forming an angle of between about 125 and 145 degrees, each of said side faces terminating at a side face termination point at the contact end thereof; and a tip portion located on the contact end of said shank, said tip portion comprising a pair of opposed major faces, each of which is bordered by a portion of one of said side faces, a portion of one of said shoulders, a contact edge that extends between two contact edge termination points, each of which is immediately adjacent a respective side face termination point, and one of a pair of dividing edges, each of which extends from a respective contact edge termination point to a central portion of a respective shoulder, each of said major faces extending away from said bordering end face to contact edge termination point, said tip portion further comprising a pair of minor faces, each of which is bordered by one of said dividing edges, a portion of one of said side faces, and a portion of one of said shoulders, each of said minor faces extending away from said bordering end face to the contact edge termination point; and striking out impaling members from a generally planar material with said punch tool, said impaling members extending from one side of said planar material.

* * * * *